United States Patent [19]

Sullivan

[11] Patent Number: 4,479,083
[45] Date of Patent: Oct. 23, 1984

[54] DC POWER SYSTEM HAVING BATTERY VOLTAGE EQUALIZER CIRCUIT

[75] Inventor: James D. Sullivan, Grove City, Ohio
[73] Assignee: Vanner, Inc., Columbus, Ohio
[21] Appl. No.: 428,579
[22] Filed: Sep. 30, 1982
[51] Int. Cl.³ .............................................. H02J 7/00
[52] U.S. Cl. ........................................ 320/6; 320/17; 320/61
[58] Field of Search .................. 320/6, 15, 17, 18, 61; 307/9

[56] References Cited

U.S. PATENT DOCUMENTS 3,667,025  5/1972  Campbell et al. ...................... 320/15
4,179,647 12/1979  Cummins et al. ........................ 320/6

Primary Examiner—William M. Shoop
Assistant Examiner—Anita M. Ault
Attorney, Agent, or Firm—Frank H. Foster

[57] ABSTRACT

An equalizer circuit is disclosed for permitting two series 12 volt batteries to supply both 24 volts and 12 volts and which maintains the batteries charged to equal voltages. The equalizer circuit is a regulated DC to DC converter with its output connected across the 12 volt battery which is connected to 12 volt loads and its input connected across either the other battery or the 24 volts of the input series pair of batteries. The reference voltage for the regulator is derived from a voltage dividing circuit which is connected across the 24 volt terminals of the two batteries. The voltage dividing circuit provides a reference voltage which is equal to half the voltage across the sum of the voltages of the two batteries.

15 Claims, 11 Drawing Figures

DC POWER SYSTEM HAVING BATTERY VOLTAGE EQUALIZER CIRCUIT

TECHNICAL FIELD OF THE INVENTION

This invention relates to DC power networks and DC/DC converters such as used on automobiles, trucks, boats and other vehicles and more particularly relates to a DC power network utilizing 12 and 24 volt loads which features a regulated DC/DC converter modified and connected to provide battery voltage equalization and improved efficiency.

BACKGROUND ART

Vehicles, such as buses, are conventionally provided with their own, on board, electrical system for supplying electrical energy to an electric motor for cranking the engine in order to start it and for operating the lights and accessories of the vehicle. Large engines, particularly diesel engines, require that a very high starting torque be developed by the starting motor. Thus, they have a high power requirement.

Storage batteries for vehicles are conventionally manufactured in mass production having a 12 volt nominal battery voltage. Because of the savings of mass production techniques, such batteries are highly desirable for use on vehicles. Similarly, 12 volt lights and accessories are manufactured in high quantities and therefore are available most inexpensively.

Because, however, the electrical starting motors require high input power, as much as 10,000 watts during cranking, very high currents are developed during cranking which can produce substantial resistive heat losses thus wasting energy, lowering voltage in the circuit and reducing the voltage actually applied to the starting motor.

Designers have sought to reduce these resistance losses by designing starting motors which operate at 24 volts. These motors also are less massive than a 12 volt motor developing the same torque.

However, if the vehicle is operated with a simple 24 volt electrical system it requires lights and accessories designed for 24 volt operation. This creates a problem because 24 volt electrical lights and accessories are not as conveniently available as their 12 volt equivalents and are more expensive because there is such a smaller demand and therefore less cost reduction from mass production and marketing. Additionally, 24 volt lights, particularly headlamps, have a shorter lifetime than their 12 volt equivalents because their filaments are thinner and therefore more subject to damage from mechanical shock.

A commonly adopted solution has been to provide 24 volts for cranking the engine but 12 volts for all the lights and accessories. One proposed method for doing this is to provide two duplicate electrical systems, one operating at 24 volts and the other at 12 volts. Such systems are expensive to install and to maintain because they require a duplicate investment in batteries, generators, regulators and the like as well as twice as many devices subject to failure and requiring repair.

Another option is to utilize two 12 volt batteries connected in series. The series voltage is utilized for cranking and the 12 volt power system is just tapped off across one of these batteries. The difficulty with that system is that one battery which supplies the 12 volts becomes discharged while the other does not. The alternator or generator used to recharge the batteries is series connected to the two batteries to charge them both at the same time. Upon charging, the battery which was not discharged will become substantially overcharged, that is charged to a higher over voltage, and will start boiling and outgassing. This causes a short lifetime and frequent replacement.

One suggested solution to that problem is to attempt to split the light and accessory load into two equal loads, one applied to each battery. Thus, half the load is applied to one battery and half the load is applied to the other. The difficulty is that it is impossible to completely balance these loads to get an even distribution of current drain and therefore eventually one of the two batteries becomes relatively less charged than the other and the same destructive problems arise. With the split load technique, the destruction just takes longer.

Yet another proposed solution is to utilize a 24 volt source but connect a DC to DC converter to it to supply 12 volts to the lights and accessories. Although this system represents an improvement, nonetheless problems still remain. First, from ageing alone the electrical characteristics of batteries will vary so that two series batteries will eventually have different charge acceptances. Eventually one will become more charged relative to the other. Thus, even if neither of the two series batteries has a separate load, nonetheless one of the batteries will eventually become relatively overcharged and the same type of damage will occur as described above. Additionally, in a system which supplies electrical energy to lights and accessories through a converter, if the converter circuitry should fail, power will not be available for emergency use. This could be extremely dangerous if the converter would fail at night while a vehicle is travelling down the road with the driver depending upon the headlights for visibility. Additionally, some loads occasionally require a high surge current of short, brief time duration. In those systems utilizing a converter to supply power to the 12 volt lights and accessories, the converter must be designed to handle the surge current.

In addition to the problem of battery failures due to overcharging, in previous systems when one battery fails it has been necessary to replace both of them. The electrical characteristics of batteries change with time and usage and therefore the use of an old and a new battery together would soon result in quick destruction of the new battery because of their differing electrical characteristics.

There is therefore a need for a network for connection to a pair of series connected batteries so that the engine cranking power can be supplied by the total series voltage of the batteries, the light and accessory power can be tapped off a single battery and yet the battery voltages are equalized and the battery to the lights and accessories will be reliably available as a backup even in the event of a catastrophic failure of the circuitry.

BRIEF DISCLOSURE OF THE INVENTION

With the present invention the light and accessory power is obtained by direct connection to one of the two series connected 12 volt batteries so that battery power is available in the event of failure of the other circuitry. A circuit embodying the present invention is connected to the three battery terminals, senses any reduction of the voltage of the battery which is supplying power to the lights and accessories and supplies current to that battery or to the load from the other battery until the battery voltages are equalized.

The equalizer circuit of the present invention is a regulated, DC to DC converter having its output connected across the 12 volt battery which is connected to the 12 volt lights and accessories, having its input connected either to the other battery or to the 24 volt terminals of the series pair of batteries and having the reference voltage for its regulator derived from a voltage dividing circuit connected across the 24 volt terminals of the batteries. The voltage dividing circuit provides a reference voltage which is equal to the product of the ratio of the desired voltage of the battery connected to the lights and accessories to the sum of the desired voltages of each of the batteries multiplied by the sum of the actual voltages of the batteries. Thus, for a nominal 24 volt system the voltage dividing circuit provides a reference voltage equal to half the total voltage across the sum of the batteries. The invention is not limited to 12 and 24 volt systems and is equally applicable to 12 and 36 volt systems, 12 and 48 volt systems as well as any other combination.

A preferred DC/DC converter is also contemplated by the invention which exhibits a substantially improved efficiency. The DC/DC converter circuit is of the type which has a DC energy source, a DC/DC converter which has a pair of input terminals and a pair of output terminals and a load connected across the output terminals. The improvement is the connection of one terminal of the source to a first one of the input terminals of appropriate polarity, the other terminal of the source being connected to a first terminal of the load and the second input terminal being connected to the second load terminal. These connections are of a polarity such that both the input current and the output current flow through the load in the same direction. The result is that the current which is switched by the converting circuitry has a magnitude of one-half that of the total load current. Thus, the losses in the circuitry are half what they would be if the full load current were switched by the switching circuitry of the converter.

The present invention results in a DC/DC converter of improved efficiency which can be arranged to efficiently and accurately equalize the voltage of each of two series connected batteries and has been tested to do so within 0.01 volts.

Because the voltages of the two batteries are equalized without regard to the electrical characteristic changes of the batteries, a failure of one battery permits only it to be replaced and does not require the usual practice of changing both batteries. This reduces battery replacement costs by one-half from this factor alone. Additionally, replacement is needed less often because the batteries do not become overcharged.

The fact that circuits embodying the present invention respond only to battery voltage also permits two batteries which are manufactured to have different characteristics to be connected in the same system. For example, an emergency vehicle may require a 12 volt source for engine cranking but may also have its radio or other accessories used for long periods of time with the engine idling or not running. This can easily be accomodated by using one battery which is designed to provide high currents for relatively short durations and another battery which is a deep cycle battery. One battery has a characteristic tailored to engine cranking and the other tailored to provide relatively low current over a long period of time.

Because the load is connected directly to the battery, catastrophic failure of the equalizing circuit will still permit power to be applied to the load and accessories for a period of time.

Yet another advantage of the present invention is that it is not necessary to design the voltage equalizer to have a surge current capacity greater than the average load current because surge current can be supplied directly from the battery.

Figure 1:
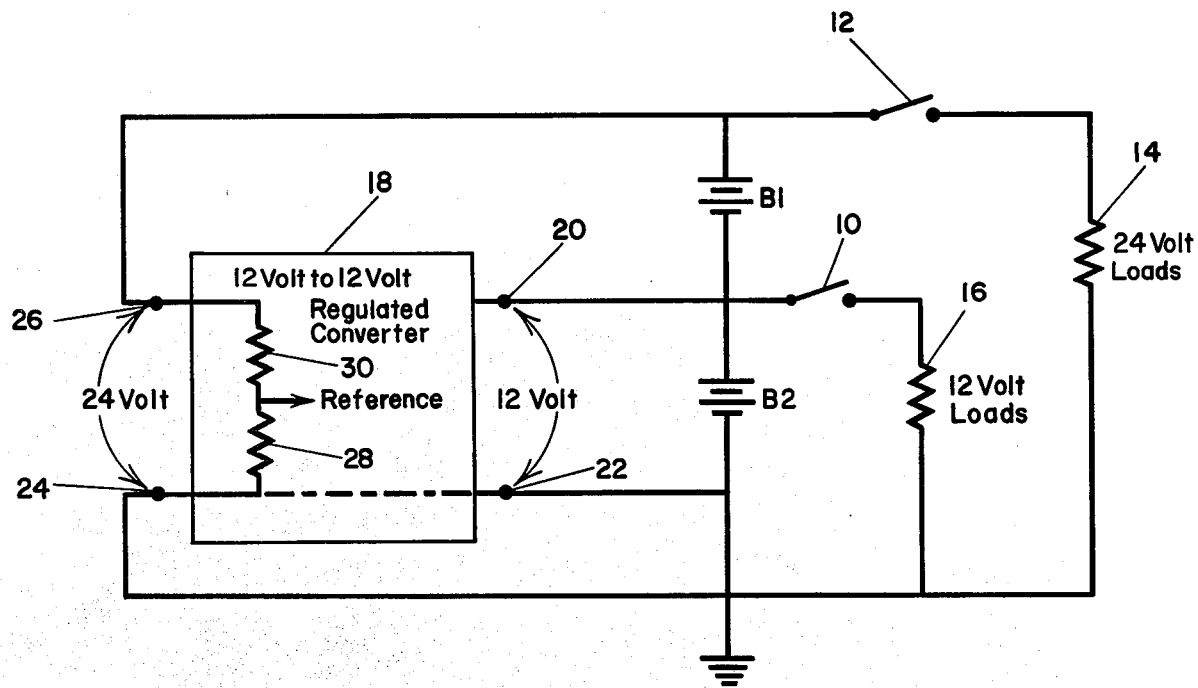
FIG. 1 is a simplified schematic diagram of one manner of connecting an equalizer embodying the present invention.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the word "connected" or the like is not limited to directly connected where connection through other circuits is recognized as equivalent in the art.

DETAILED DESCRIPTION OF THE PREFERRED EMBODIMENT

The present invention is not limited to the use of 12 volt batteries or to two series batteries forming a 24 volt system. The present invention can be utilized with batteries of different nominal voltages and also may be utilized with more than two series connected batteries. For example, a 36 or 48 volt system can be constructed of three or four 12 volt batteries with the lights and accessories being operated from one of them.

The present invention may be considered by examining the manner in which it differs from a conventional, generic type of DC/DC converter. A converter ordinarily has a pair of input terminals connected to a DC source and a pair of output terminals connected to a DC load. The converter ordinarily converts DC at one voltage to DC at another voltage because that is the usual need. A DC/DC converter can, of course, have the same voltage applied to its input as supplied to the load from its output.

The battery voltage equalizing circuits of the present invention differ from conventional DC/DC converters in two important respects in order to obtain the advantages of the invention. First, the reference voltage of the regulators are provided from a voltage dividing circuit across the totality of the series connected batteries instead of from a relatively fixed voltage reference source. Secondly, the connection of the sources and loads is different from the conventional connection.

For embodiments of the invention used as a converter but not as an equalizer but also preferably for the equalizing circuitry, one of the input terminals of the converter is connected to the load in such a manner that the input current also flows through the load and does so in the same direction as the output current flows through the load. However, when used solely as a converter and not for battery equalization, the voltage reference for the regulator becomes a conventional fixed voltage such as may be developed across a zener diode.

Turning now to the figures, FIG. 1 illustrates the series connected batteries B1 and B2 which are connected through switches 10 and 12 to a 24 volt load 14 and a 12 volt load 16. A regulated converter 18 is provided with output terminals 20 and 22 as well as input terminals 24 and 26. In the conventional manner the output terminal 22 and input terminal 24 may be internally common as shown in phantom. The output terminals 20 and 22 are connected across the battery B2. The input terminals 24 and 26 are connected across the series batteries B1 and B2 so that the input voltage applied to the converter 18 is the sum voltage of those two batteries. Illustrated within the block designating the converter 18 are a pair of series connected resistances 28 and 30 to illustrate the connection of a voltage dividing circuit for providing a reference voltage to the regulator circuitry of the regulated converter 18.

Figure 2:
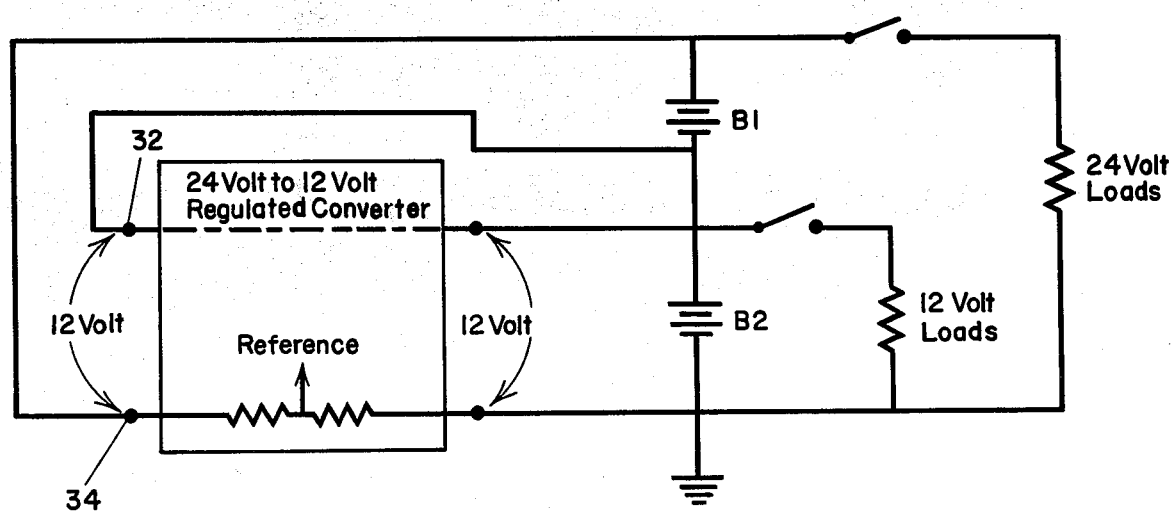
FIG. 2 is a simplified schematic diagram of a second way of connecting an equalizer embodying the present invention.

The circuit of FIG. 2 is different from the circuit of FIG. 1 in that the input terminals 32 and 34 of FIG. 2 are connected across the battery B1 instead of across the series pair of batteries.

Thus, FIG. 1 and FIG. 2 both show improved DC power networks which include battery equalization and which comprise a regulated DC/DC converter having its output directly connected to the same battery as the lower voltage loads, such as the 12 volt lights and accessories, instead of being connected through the converter. In both circuits the regulator reference voltage is derived from a voltage divider circuit. The difference between these two circuits is that one circuit has the converter input connected across the battery to which the lower voltage loads are not connected and the other circuit has the converter input connected across the sum total of the batteries.

The voltage dividing circuit provides a reference voltage as follows:

$$V_{ref} = \frac{[\text{nominal voltage } B2]}{\text{nominal voltage } B1 + \text{nominal voltage } B2} \times [\text{actual voltage } B1 + \text{actual voltage } B2]$$

Thus, if the battery voltages are designed to be equal, then the reference voltage is equal to one-half the sum of the voltages of the two batteries.

Figure 3:
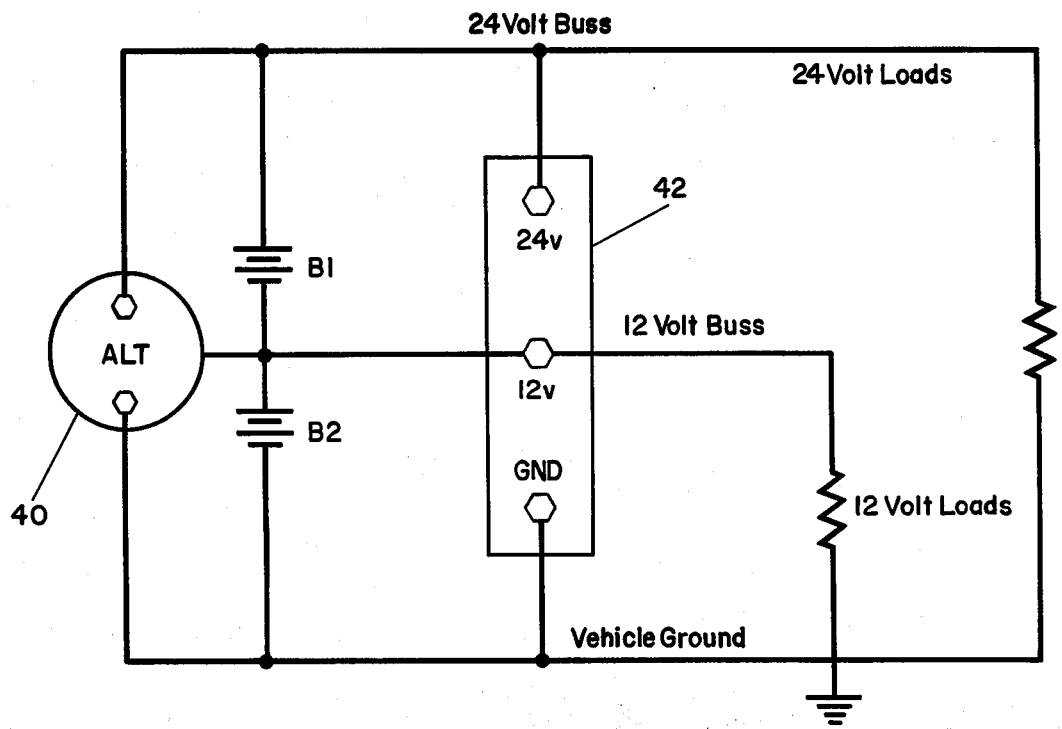
FIG. 3 is a simplified schematic diagram illustrating the external connections to both the FIG. 1 and FIG. 2 embodiments of the invention.

FIG. 3 illustrates a circuit diagram of either of the embodiments in FIGS. 1 and 2 together with the addition of an alternator 40 such as would be present on a vehicle in many systems. As is well known in converter technology, the regulator of a converter operates to cause its output current to vary in a manner which tends to change the output voltage toward the value of the reference voltage. Thus, the output voltage is made to track toward the reference voltage. Therefore, in the circuit of FIG. 2, if the battery B2 should become discharged to a lower voltage than the battery B1, due to the demands of the 12 volt loads, then energy is supplied to the converter output terminals from the battery B1 because the output terminals will be at a lower voltage than one-half the sum of the battery voltages. In the circuit of FIG. 1, if the voltage of battery B2 is less than that of battery B1, energy is supplied to the converter output terminals from the sum of both batteries B1 and B2. If the loads are disconnected, the supplied energy may be used to charge battery B2 until it is of equal voltage to battery B1. If the load is connected, the energy may be supplied to the load or to both the load and to battery B2.

Figure 4:
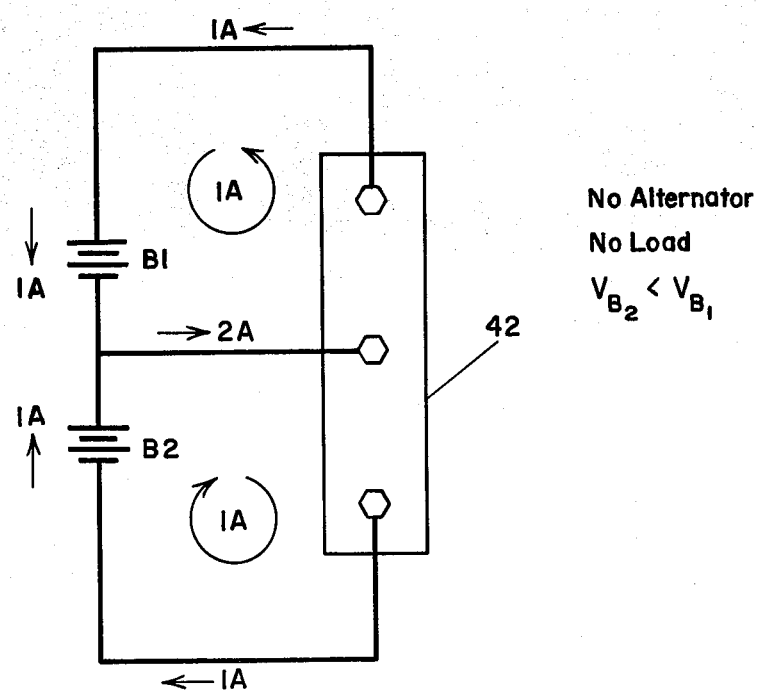
FIGS. 4 through 8 illustrate the operation of the preferred embodiment of the invention.

FIG. 4 illustrates the connection of the equalizer 42 of FIG. 3 with no loading, with no charging from the alternator and with the voltage of battery B2 less than the voltage from battery B1. Under these typical conditions battery B1 is supplying energy to battery B2.

Figure 5:
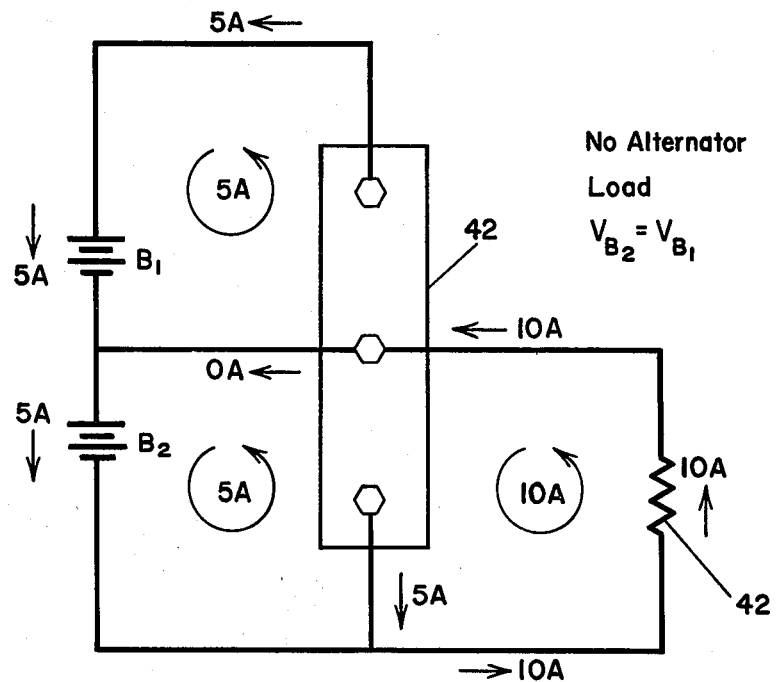

In FIG. 5 a load 42 with a 10 amp current has been added and the battery voltages are equal. In that event, both batteries are supplying energy at an equal rate and therefore are discharging at an equal rate. Thus, they may be later charged in series.

Figure 6:
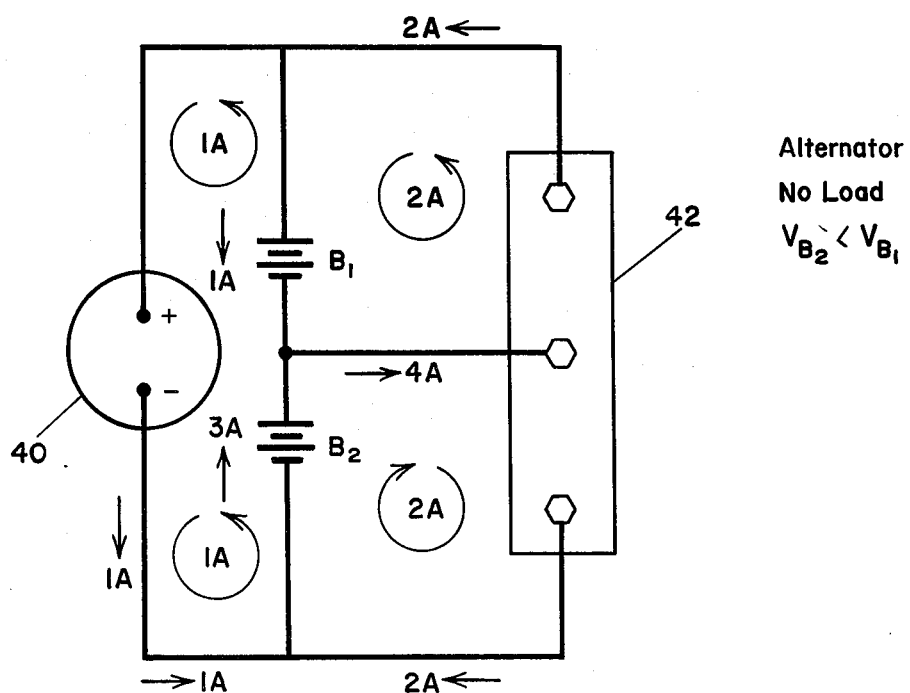

FIG. 6 illustrates the connection of an alternator without a load and with the voltage of battery B2 less than the voltage of battery B1. Under these conditions both battery B1 and the alternator 40 are supplying energy to charge the battery B2. When the battery voltages are equalized, the current through the equalizer circuit 42 will go essentially to zero because its output voltage will equal its reference voltage and all the charging current will be supplied in series through both batteries by the alternator 40 to further charge both batteries equally.

Figure 7:
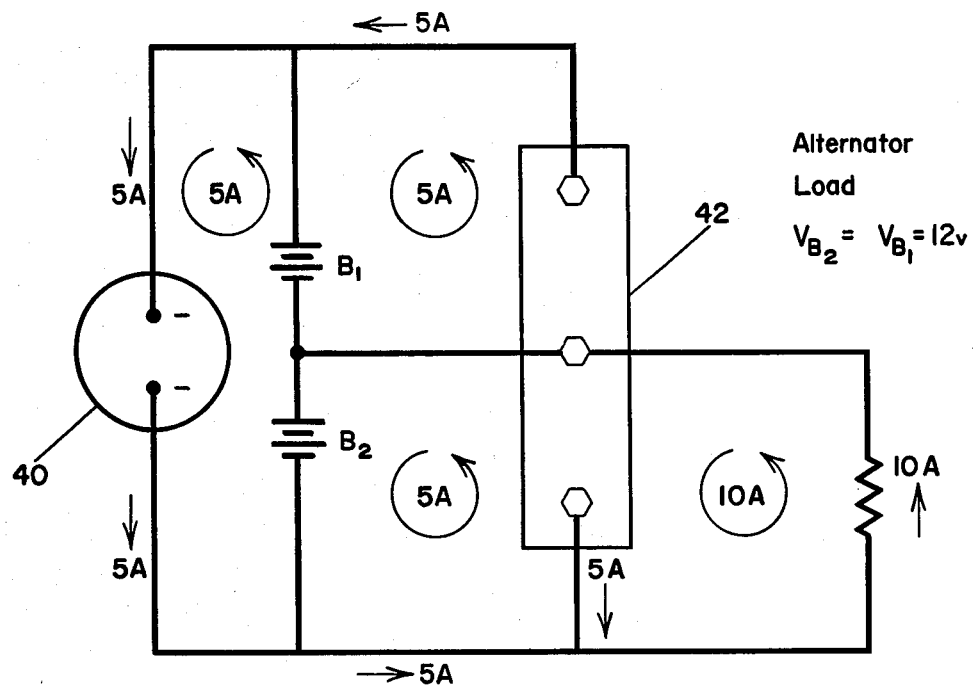

FIG. 7 illustrates the conditions under which the batteries are both fully charged to 12 volts and a 10 amp load is being supplied. Under these conditions the energy is being supplied totally from the alternator 40, essentially all of it through the equalizer circuit 42.

Figure 8:
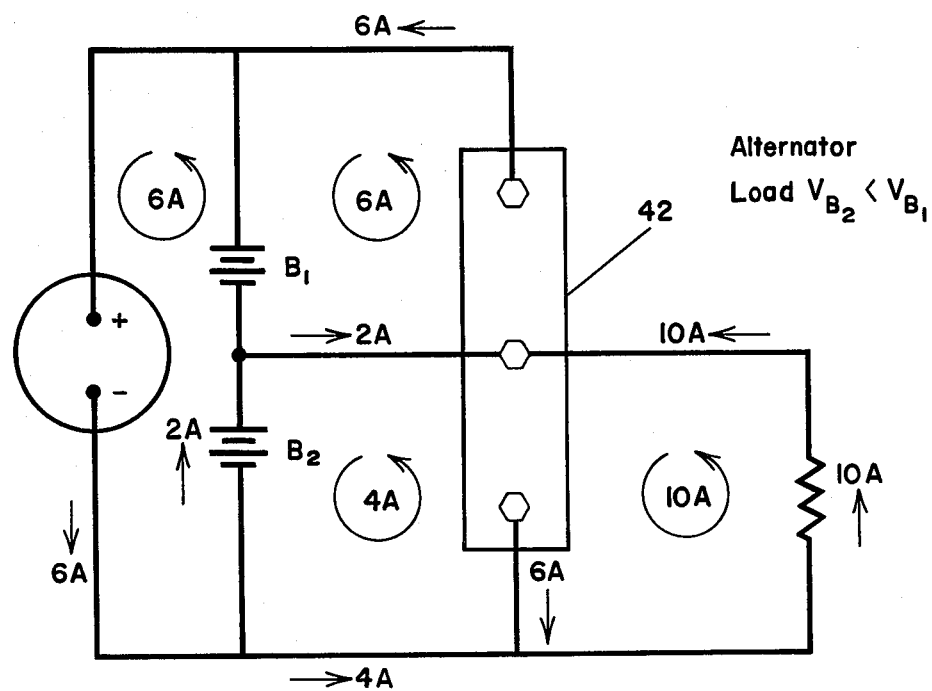

Finally, FIG. 8 illustrates current flow when battery B2 has been discharged to a voltage lower than B1 and the load is supplied with the current of 10 amps. Under these conditions the alternator provides current through the equalizer 42 to the load and also for charging the battery B2.

The actual operation may be a composite of various of the conditions illustrated in FIGS. 4 through 8. Typically, when a vehicle engine is operating fast enough to provide energy to the load, the conditions of FIG. 7 will exist. The batteries in normal operation remain at essentially the same voltage because whenever battery B2 becomes infinitesimally lower in voltage than battery B1, energy is transferred to battery B2 either from the generator or from battery B1 or both until the battery voltages are equalized.

If conditions would exist that battery B1 would become discharged to a lower voltage than B2, then the load itself will reduce the charge of battery B2 until they are equalized with no current flowing through the equalizer circuit 42.

Figure 9:
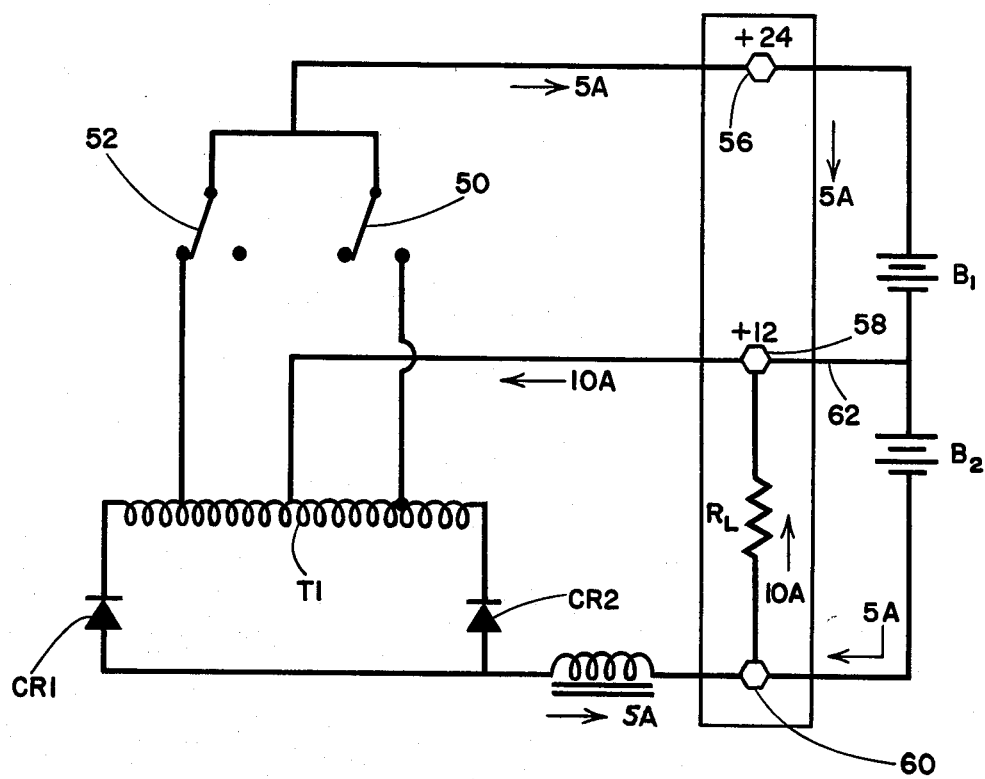
FIG. 9 is a simplified schematic diagram illustrating the operation of the preferred embodiment of the battery voltage equalizer.

FIG. 9 illustrates a simplified unregulated DC/DC converter connected in accordance with the present invention in the manner of the circuit of FIG. 2. Current from battery B1 is alternately switched by switches 50 and 52 in opposite directions through the transformer T1. The voltage induced across transformer T1 provides a load current which is rectified by diodes CR-1 and CR-2. If the battery voltages are nominally equal and if the converter is designed to convert an input voltage to the same output voltage, for example 12 volt input to 12 volt output, then the current relationships are such that the load current is one-half the current switched by the switches 50 and 52. This occurs because both the input current and the output current are made to flow through the load in the same direction and thus are cumulative. This enables a 10 amp load to be supplied while switching only 5 amps of current. Thus, with half the current being switched by the switching devices only half the energy is wasted and therefore the efficiency is substantially improved. The converter is connected, in order to accomplish this improved efficiency, so that one terminal of the input source, battery B1 of FIG. 9, is connected to a first one 56 of the input terminals at a polarity which is appropriate for that terminal. For example, if the converter ordinarily would take a positive voltage at the terminal 56, the positive terminal of battery B1 is connected to the terminal 56. The other terminal of the energy source, battery B1 in FIG. 9, is connected to a first terminal 58 of the load $R_L$. The second input terminal 60 is connected to the second terminal of the load $R_L$.

Figure 10:
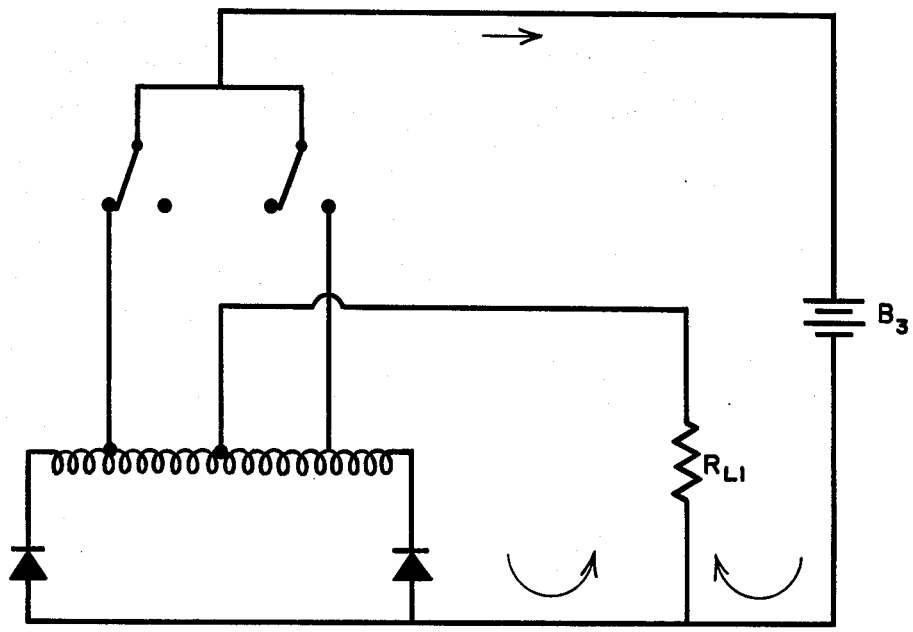
FIG. 10 is a simplified diagram illustrating the operation of the DC/DC converter embodying the present invention,.

If batteries B1 and B2 are equally charged then no current will flow in conductor 62 which connects the node intermediate the batteries to the terminal 58. Therefore, that conductor can be removed and both batteries lumped together and considered as battery B3 as illustrated in FIG. 10. Thus, the circuit of FIG. 10, while not capable of equalizing two batteries, does provide a converter for supplying energy to a load $R_L$ and switching only half the load current thereby providing the improved efficiency.

Figure 11A:
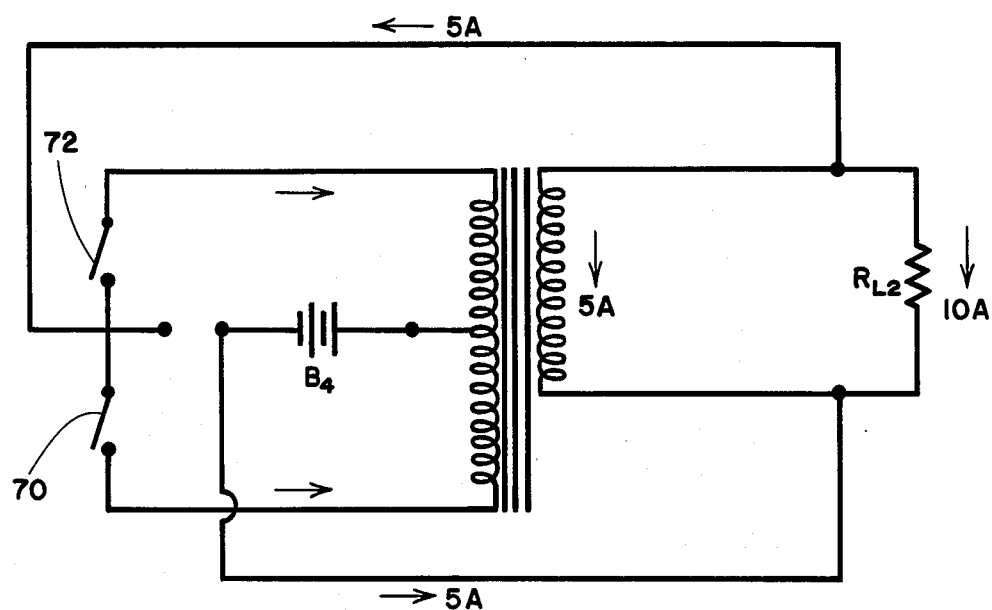
FIG. 11 is a detailed schematic diagram illustrating the preferred embodiment of the invention.
Figure 11:
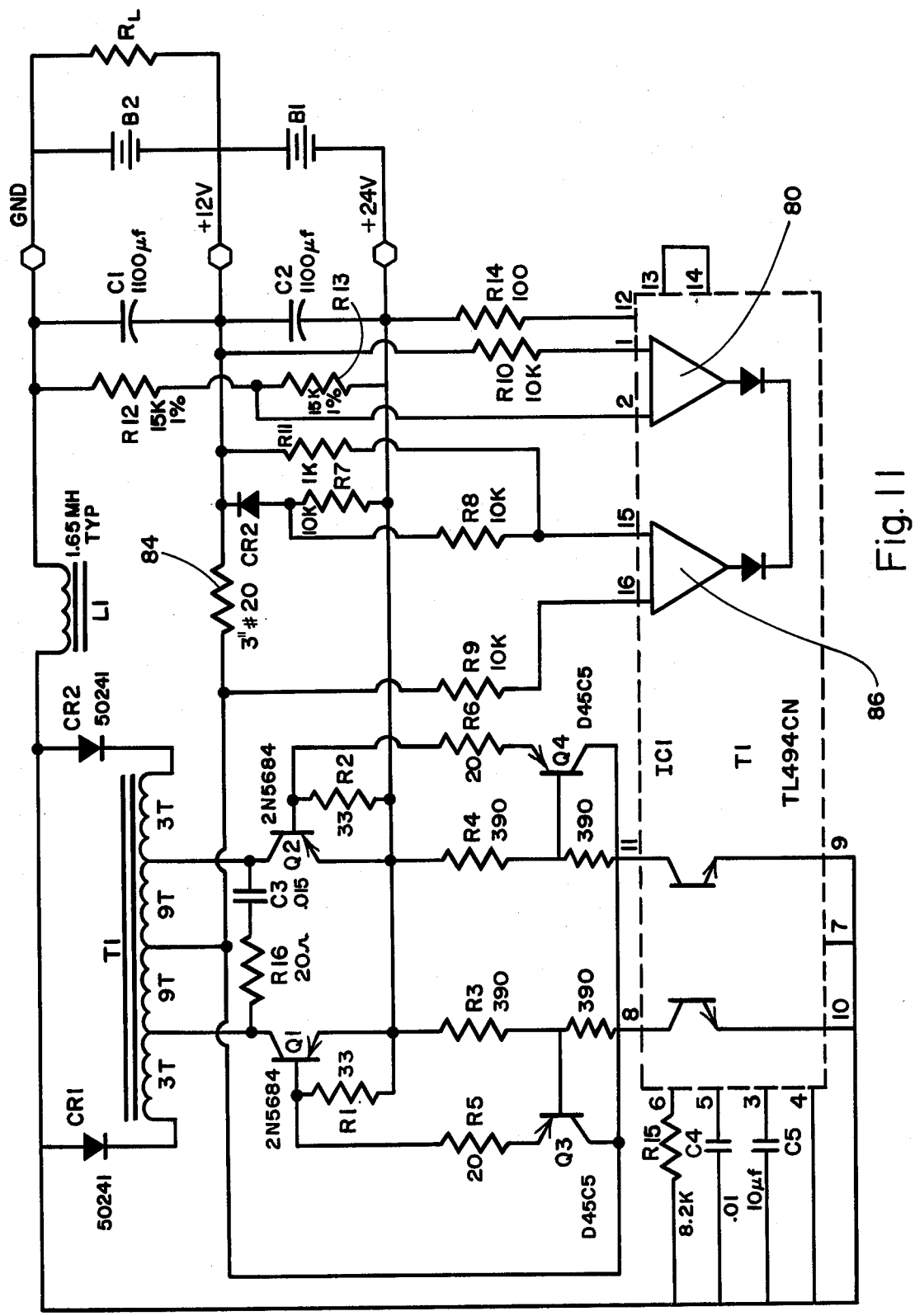

FIG. 11 illustrates details of the preferred embodiment of the invention connected to batteries B1 and B2 and load $R_L$. Resistors R12 and R13 form the voltage dividing circuit which feeds the reference voltage to an integrated circuit IC1 designed for pulse width modulation. That reference voltage together with the input voltage, applied through resistor R10, are both applied to a comparator 80. The output of comparator 80 is compared to a sawtooth and used to control the output pulse width from output pins 8 and 11 in the conventional manner. These output pulses are applied through transistors Q3 and Q4 to current switching transistors Q1 and Q2 which operate to switch the input current in alternately opposite directions through the transformer T1.

In order to provide a current limiting feature, the current sensing resistor 84 is series connected with the output to develop a voltage which is proportional to the equalizer output current. That voltage is applied through resistor R9 to a comparator 86. Additionally, a voltage is developed from a zener voltage reference diode CR3 which is applied through resistor R8 to the comparator 86. The output of comparator 86 also aids in controlling the pulse width. If the output current is sufficiently low such that the voltage across the current sensing resistance 84 is less than the voltage across the voltage reference diode CR3, output of the comparator 86 does not effect the pulse width. However, as the voltage across the current sensing resistance 84 exceeds the voltage of the voltage reference diode CR3, the output of comparator 86 switches and increases to limit the pulse width thereby limiting the output current.

When operating at frequencies higher than 300 Hz or 400 Hz where junction capacitances and transistor switching times become significant, it is desirable to incorporate into the circuitry those circuit modifications which are known to those skilled in the art for reducing switching losses. Increasing the frequency of operation to 17 KHZ to 20 KHZ, for example, reduces transformer size and therefore reduces cost and weight. It then is advantageous, for example, to use reverse bias techniques to reduce the switching times of the switching transistors and thereby reduce switching losses.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. An improved DC power network comprising:
   (a) a series connected pair of batteries;
   (b) an electrical generator connected across said series pair;
   (c) an equalizer circuit for equalizing the voltages of said batteries and comprising a regulated DC/DC converter for converting electrical energy to the voltage of a first one of said batteries from the sum of the voltages of said batteries, said converter having its input connected across said pair of batteries and its output connected to said first battery, the regulator circuit of said converter including a voltage dividing circuit connected across said pair of batteries to provide the regulator with its reference voltage equal to the product of the ratio of the desired voltage of said first battery to the sum of the desired voltages of each of said batteries multiplied by the sum of the actual voltages of said batteries;
   (d) a load connectable across said series pair; and
   (e) a load connectable across said first battery.

2. A network in accordance with claim 1 wherein said batteries are each 12 volt batteries and said network is a vehicle electrical system.

3. A network in accordance with claim 1 wherein said voltage dividing circuit comprises a pair of resistors connected in series as a voltage divider.

4. An improved DC power network comprising:
   (a) a series connected pair of batteries;
   (b) an electrical generator connected across said series pair;
   (c) an equalizer circuit for equalizing the voltages of said batteries and comprising a regulated DC/DC converter for converting electrical energy to the voltage of a first one of said batteries from the voltage of the other of said batteries, said converter having its input connected to said other battery and its output connected to said first battery, the regulator circuit of said converter including a voltage dividing circuit connected across said pair of batteries to provide the regulator with its reference voltage equal to the product of the ratio of the desired voltage of said first battery to the sum of the desired voltages of each of said batteries multiplied by the sum of the actual voltages of said batteries;
   (d) a load connectable across said series pair; and
   (e) a load connectable across said first battery.

5. A network in accordance with claim 4 wherein said batteries are each 12 volt batteries and said network is a vehicle electrical system.

6. A network in accordance with claim 4 wherein said voltage dividing circuit comprises a pair of resistors connected in series as a voltage divider.

7. An equalizer circuit for equalizing the voltages of a series connected pair of batteries which at times have a load connected across said pair and at times have a load connected across a single one of said pairs, said equalizer comprising:

a regulated DC/DC converter for converting electrical energy to the voltage of said single one of said batteries from the sum of the voltages of said batteries, said converter having its input connected across said pair of batteries and its output connected to said single one battery, the regulator circuit of said converter including a voltage dividing circuit connected across said pair of batteries to provide the regulator with its reference voltage equal to the product of the ratio of the desired voltage of said single one battery to the sum of the desired voltages of each of said batteries multiplied by the sum of the actual voltages of said batteries.

8. An equalizer circuit in accordance with claim 7 wherein each of said batteries are 12 v batteries.

9. A equalizer circuit in accordance with claim 7 wherein said voltage dividing circuit comprises a pair of resistors connected in series as a voltage divider.

10. An equalizer circuit in accordance with claim 7 or 8 wherein a current sensing resistor is interposed in series with the equalizer circuit terminal which is connected to the node intermediate the batteries for developing a current sensing voltage proportional to the current from said equalizer to said intermediate node and wherein said regulator is a pulse width modulator type having a modulating input proportional to the sum of the outputs from at least two comparators, one of said comparators having one input connected to sense the output voltages of said converter and its other input connected to said reference voltage, the other comparator having one input connected to said current sensing voltage and the other input connected to a second, current limiting reference voltage.

11. An equalizer circuit for equalizing the voltages of a series connected pair of batteries which at times have a load connected across said pair and at times have a load connected across a single one of said pair, said equalizer comprising:

a regulated DC/DC converter for converting electrical energy to the voltage of said single one of said batteries from the voltage of the other of said batteries, said converter having its input connected to said other battery and its output connected to said single one battery, the regulator circuit of said converter including a voltage dividing circuit connected across said pair of batteries to provide the regulator with its reference voltage equal to the product of the ratio of the desired voltage of said single one battery to the sum of the desired voltages of each of said batteries multiplied by the sum of the actual voltages of said batteries.

12. An equalizer circuit in accordance with claim 11 wherein each of said batteries are 12 v batteries.

13. A network in accordance with claim 11 wherein said voltage dividing circuit comprises a pair of resistors connected in series as a voltage divider.

14. An equalizer circuit in accordance with claim 11 or 12 wherein the input and output connections to the node intermediate the batteries are connected to a series, current sensing resistor for developing a current sensing voltage proportional to the current from said equalizer to said intermediate node and wherein said regulator is a pulse width modulator type having modulating input proportional to the sum of the outputs from at least two comparators, one of said comparators having one input connected to sense the output voltage of said converter and its other input connected to said reference voltage, the other comparator having one input connected to said current sensing voltage and the other input connected to a second, current limiting reference voltage.

15. A DC/DC converter circuit of the type including a DC energy source, a DC/DC converter having a pair of input terminals and a pair of output terminals and a load connected across said output terminals, wherein the improvement comprises:

One terminal of said source connected to a first one of said input terminals of appropriate polarity, the other terminal of said source connected to a first terminal of said load and the second input terminal connected to the second load terminal, all connections being of a polarity so that both input current and output current flows through said load in the same direction.

* * * * *

REEXAMINATION CERTIFICATE (3616th)

United States Patent [19]

Sullivan

[11] B1 4,479,083
[45] Certificate Issued Sep. 1, 1998

[54] DC POWER SYSTEM HAVING BATTERY VOLTAGE EQUALIZER CIRCUIT

[75] Inventor: James D. Sullivan, Grove City, Ohio

[73] Assignee: Vanner Weldon Incorporated, Hilliard, Ohio

Reexamination Request:
No. 90/004,343, Aug. 27, 1996

Reexamination Certificate for:
Patent No.: 4,479,083
Issued: Oct. 23, 1984
Appl. No.: 428,579
Filed: Sep. 30, 1982

[51] Int. Cl.$^6$ ........................................ H02J 7/00
[52] U.S. Cl. ............................... 320/123; 320/140
[58] Field of Search ........................... 320/5, 6, 9, 15, 320/17, 18, 61, 123, 140, 143, 104, 105, 108, 114, 116, 117, 160; 307/9.1, 11

[56] References Cited

U.S. PATENT DOCUMENTS

3,667,025  5/1972  Campbell et al. ...................... 320/15
4,210,856  7/1980  Taylor ...................................... 320/17

FOREIGN PATENT DOCUMENTS

1564691  4/1980  United Kingdom .

OTHER PUBLICATIONS

*Van Nostrand's Scientific Encyclopedia*, pp. 264–265 (Douglas M. Considine ed., 5th ed. 1968).

*Primary Examiner*—Edward H. Tsu

[57] ABSTRACT

An equalizer circuit is disclosed for permitting two series 12 volt batteries to supply both 24 volts and 12 volts and which maintains the batteries charged to equal voltages. The equalizer circuit is a regulated DC to DC converter with its output connected across the 12 volt battery which is connected to 12 volt loads and its input connected across either the other battery or the 24 volts of the input series pair of batteries. The reference voltage for the regulator is derived from a voltage dividing circuit which is connected across the 24 volt terminals of the two batteries. The voltage dividing circuit provides a reference voltage which is equal to half the voltage across the sum of the voltages of the two batteries.

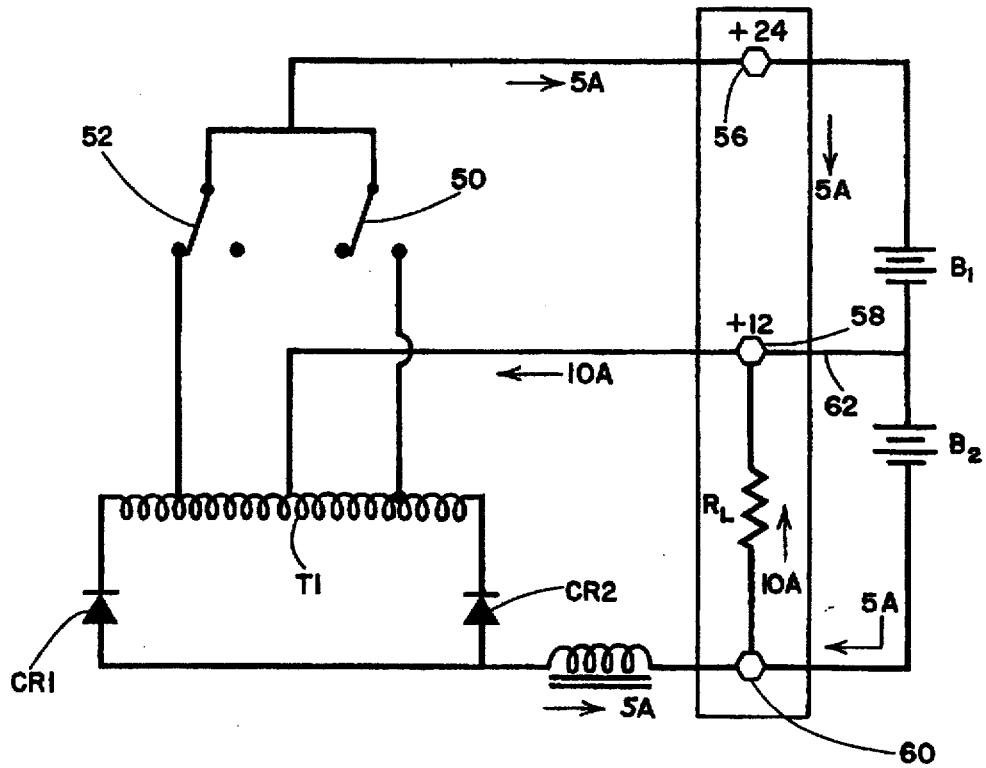

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 15 is cancelled.

Claims 1, 4, 7, 10 and 11 are determined to be patentable as amended.

Claims 2, 3, 5, 6, 8, 9 and 12–14, dependent on an amended claim, are determined to be patentable.

New claims 16–19 are added and determined to be patentable.

1. An improved DC power network comprising:
(a) a series connected pair of batteries;
(b) an electrical generator connected across said series pair;
(c) an equalizer circuit for equalizing the voltages of said batteries and comprising a [regulated] DC/DC converter *having a regulator circuit* for converting electrical energy to the voltage of a first one of said batteries from the sum of the voltages of said batteries, said converter having its input connected across said pair of batteries and its output connected to said first battery, *and further comprising an autotransformer having a tap connected to a node intermediate said series connected pair of batteries,* the regulator *circuit* of said converter including a voltage dividing circuit connected across said pair of batteries to provide the regulator *circuit* with its reference voltage equal to the product of the ratio of the desired voltage of said first battery to the sum of the desired voltages of each of said batteries multiplied by the sum of the actual voltages of said batteries;
(d) a load connectable across said series pair; and
(e) a load connectable across said first battery.

4. An improved DC power network comprising:
(a) a series connected pair of batteries;
(b) an electrical generator connected across said series pair;
(c) an equalizer circuit for equalizing the voltages of said batteries and comprising a [regulated] DC/DC converter *having a regulator circuit* for converting electrical energy to the voltage of a first one of said batteries from the voltage of the other of said batteries, said converter having its input connected to said other battery and its output connected to said first battery, *and further comprising an autotransformer having a tap connected to a node intermediate said series connected pair of batteries,* the regulator *circuit* of said converter including a voltage dividing circuit connected across said pair of batteries to provide the regulator *circuit* with its reference voltage equal to the product of the ratio of the desired voltage of said first battery to the sum of the desired voltages of each of said batteries multiplied by the sum of the actual voltages of said batteries;
(d) a load connectable across said series pair; and
(e) a load connectable across said first battery.

7. An equalizer circuit for equalizing the voltages of a series connected pair of batteries which at times have a load connected across said pair and at times have a load connected across a single one of said pairs, said equalizer comprising:

a [regulated] DC/DC converter *having a regulator circuit* for converting electrical energy to the voltage of said single one of said batteries from the sum of the voltages of said batteries, said converter having its input connected across said pair of batteries and its output connected to said single one battery, *and further comprising an autotransformer having a tap connected to a node intermediate said series connected pair of batteries,* the regulator circuit of said converter including a voltage dividing circuit connected across said pair of batteries to provide the regulator *circuit* with its reference voltage equal to the product of the ratio of the desired voltage of said single one battery to the sum of the desired voltages of each of said batteries multiplied by the sum of the actual voltages of said batteries.

10. An equalizer circuit in accordance with claim 7 or 8 wherein a current sensing resistor is interposed in series with [the] *an* equalizer circuit terminal which is connected to the node intermediate the batteries for developing a current sensing voltage proportional to the current from said equalizer *circuit* to said intermediate node and wherein said regulator is a pulse width modulator type having a modulating input proportional to the sum of the outputs from at least two comparators, one of said comparators having one input connected to sense the output voltages of said converter and its other input connected to said reference voltage, the other comparator having one input connected to said current sensing voltage and the other input connected to a second, current limiting reference voltage.

11. An equalizer circuit for equalizing the voltages of a series connected pair of batteries which at times have a load connected across said pair and at times have a load connected across a single one of said pair, said equalizer comprising:

a [regulated] DC/DC converter *having a regulator circuit* for converting electrical energy to the voltage of said single one of said batteries from the voltage of the other of said batteries, said converter having its input connected to said other battery and its output connected to said single one battery, *and further comprising an autotransformer having a tap connected to a node intermediate said series connected pair of batteries,* the regulator circuit of said converter including a voltage dividing circuit connected across said pair of batteries to provide the regulator *circuit* with its reference voltage equal to the product of the ratio of the desired voltage of said single one battery to the sum of the desired voltages of each of said batteries multiplied by the sum of the actual voltages of said batteries.

*16. An equalizer circuit for equalizing the voltages of a series connected pair of batteries which at times have a load connected across said pair and at times have a load connected across a single one of said pairs, said equalizer comprising:*

*a DC/DC converter having a regulator circuit for converting electrical energy to the voltage of said single* one of said batteries from the sum of the voltages of said batteries, said converter having its input connected across said pair of batteries and its output connected across said single one battery, the regulator circuit of said converter including a voltage dividing circuit connected across said pair of batteries to provide the regulator with its reference voltage equal to the product of the ratio of the desired voltage of said single one battery to the sum of the desired voltages of each of said batteries multiplied by the sum of the actual voltages of said batteries, wherein a current sensing resistor is interposed in series with an equalizer circuit terminal which is connected to the node intermediate the batteries for developing a current sensing voltage proportional to the current from said equalizer circuit to said intermediate node and wherein said regulator circuit includes a pulse width modulator type circuitry having a modulating input proportional to the sum of the outputs from at least two comparators, one of said comparators having one input connected to sense the output voltages of said converter and its other input connected to said reference voltage, the other comparator having one input connected to said current sensing voltage and the other input connected to a second, current limiting reference voltage.

17. An equalizer circuit for equalizing the voltages of a series connected pair of batteries which at times have a load connected across said pair and at times have a load connected across a single one of said pair, said equalizer comprising:

a DC/DC converter having a regulator circut for converting electrical energy to the voltage of said single one of said batteries from the voltage of the other of said batteries, said converter having its input connected to said other battery and its output connected across said single one battery, the regulator circuit of said converter including a voltage dividing circuit connected across said pair of batteries to provide the regulator with a reference voltage equal to the product of the ratio of the desired voltage of said single one battery to the sum of the desired voltages of each of said batteries multiplied by the sum of the actual voltages of said batteries, wherein the input and output connections to the node intermediate the batteries are connected to a series, current sensing resistor for developing a current sensing voltage proportional to the current from said equalizer circuit to said intermediate node and wherein said regulator circuit includes a pulse width modulator type circuitry having modulating input proportional to the sum of the outputs from at least two comparators, one of said comparators having one input connected to sense the output voltage of said converter and its other input connected to said reference voltage, the other comparator having one input connected to said current sensing voltage and the other input connected to a second, current limiting reference voltage.

18. A network in accordance with claims 1, 4, 7, 11, 16 or 17 wherein opposite ends of a first set of windings of said autotransformer is connected to current switching transistors for switching the current to said autotransformer in alternating opposite directions.

19. A network in accordance with claims 1, 4, 7, 11, 16 or 17 additionally comprising current rectifying diodes, wherein said autotransformer is provided with additional windings intermediate said first set of windings and said rectifying devices and being electrically connect therebetween.

* * * * *